(12) United States Patent
Kahn et al.

(10) Patent No.: US 9,264,849 B1
(45) Date of Patent: Feb. 16, 2016

(54) METHOD AND APPARATUS TO ENABLE LOCATION-BASED MEETING

(75) Inventors: Philippe Richard Kahn, Santa Cruz, CA (US); Arthur Kinsolving, Santa Cruz, CA (US)

(73) Assignee: DP Technologies Inc., Scotts Valley, CA (US)

( * ) Notice: Subject to any disclaimer, the term of this patent is extended or adjusted under 35 U.S.C. 154(b) by 689 days.

(21) Appl. No.: 12/945,770

(22) Filed: Nov. 12, 2010

(51) Int. Cl.
*G06Q 10/04* (2012.01)
*G06Q 10/10* (2012.01)
*H04W 4/02* (2009.01)

(52) U.S. Cl.
CPC .............. *H04W 4/02* (2013.01); *G06Q 10/04* (2013.01); *G06Q 10/1095* (2013.01)

(58) Field of Classification Search
CPC .............. H04W 64/00; H04W 48/04; H04W 4/02–4/046; H04L 29/08936; H04L 29/08657; H04M 1/72572; G06Q 10/04; G06Q 10/1095
USPC ......... 455/456.1–456.3, 404.2; 701/204, 213, 701/300
See application file for complete search history.

(56) References Cited

U.S. PATENT DOCUMENTS

| 7,076,505 B2 | 7/2006 | Campbell |
| 8,395,529 B2 | 3/2013 | Seder et al. |
| 2007/0282661 A1* | 12/2007 | Franco ............................. 705/9 |
| 2008/0172173 A1* | 7/2008 | Chang et al. .................. 701/207 |
| 2009/0055238 A1* | 2/2009 | Baryshnikov et al. ............. 705/8 |
| 2009/0125229 A1 | 5/2009 | Peri et al. |
| 2009/0235176 A1* | 9/2009 | Jayanthi ........................ 715/738 |
| 2009/0254843 A1* | 10/2009 | Van Wie et al. ................ 715/757 |
| 2009/0276318 A1* | 11/2009 | Broadbent et al. ......... 705/14.64 |
| 2010/0082247 A1* | 4/2010 | Klein et al. ..................... 701/209 |
| 2010/0125478 A1* | 5/2010 | Bisht ................................. 705/8 |
| 2010/0190510 A1 | 7/2010 | Maranhas et al. |
| 2010/0211425 A1* | 8/2010 | Govindarajan ................... 705/8 |
| 2010/0253541 A1 | 10/2010 | Seder et al. |
| 2011/0238647 A1* | 9/2011 | Ingram et al. ................. 707/706 |
| 2012/0041672 A1* | 2/2012 | Curtis et al. .......... H04H 20/57 701/426 |

OTHER PUBLICATIONS

Chadwick, Bill, "Google Maps and Microsoft MapCruncher," <http://www.bdcc.co.uk/GoogleCrunch/Crunch.htm>, Oct. 2007, Accessed Sep. 23, 2010, 19 pages.
Navteq, "Navigation Software for the Apple iPhone 3G and 3GS," User Manual, iGo My Way 2009, Jul. 2009, Ver 1.0, 78 pages.
"Apple plagiarizing others' work in patent diagrams?," <http://www.ipodnn.com/articles/10/08/06/2009.document.depicts.existing.iphone.app/>, Accessed Nov. 10, 2010, 16 pages.

\* cited by examiner

*Primary Examiner* — Larry Sternbane
(74) *Attorney, Agent, or Firm* — HIPLegal LLP; Judith A. Szepesi

(57) ABSTRACT

A method or apparatus to provide a display of friends in a local area to a user, receive a request to meet, and calculate an optimal location for a meeting is described. In one embodiment, the system provides guidance to the user to the optimal location.

20 Claims, 10 Drawing Sheets

US 9,264,849 B1

METHOD AND APPARATUS TO ENABLE LOCATION-BASED MEETING

FIELD OF THE INVENTION

The present invention relates to location-based services, and more precisely to services provided to users to interact with other users, based on location.

BACKGROUND

As mobile devices become location-enabled, with GPS, network triangulation, and other services, location based services are becoming more common. These location based services include check-in based services such as FACEBOOK PLACES™ by FACEBOOK™ or an application available on a mobile phone called FOURSQUARE™. These applications enable you to find out the location(s) where your friends have checked into the system, or otherwise indicated their current location, and in some cases view them on a map.

SUMMARY

A method or apparatus to provide location-based service is described. The method, in one embodiment, includes identifying locations of a plurality of friends, and sharing those locations with each of the friends. The method in one embodiment further includes assisting the friends in selecting a meeting destination. The meeting destination, in one embodiment selected as being optimally located.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
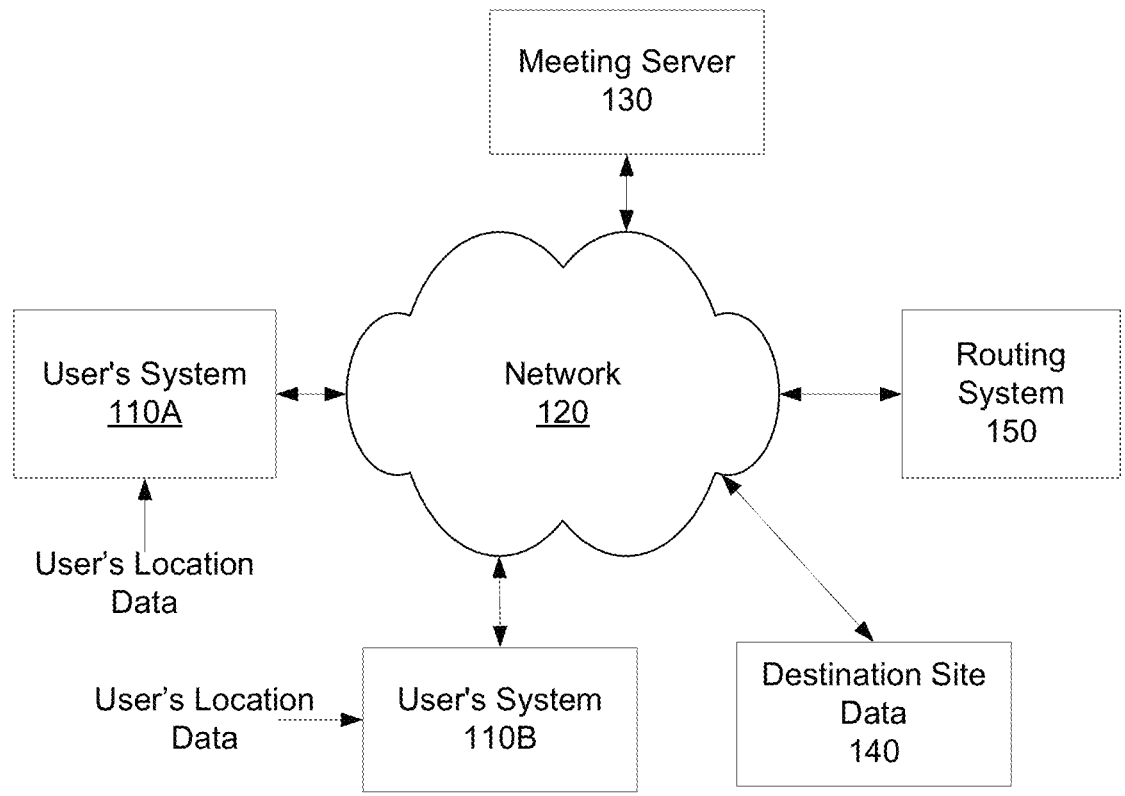
FIG. 1 is a block diagram of the network in which one embodiment of the system may be implemented.

The method and apparatus described is a tool to enable users to meet friends, based on their locations. In one embodiment, the system enables users to check into the system, or to provide their locations on another basis to other users. The system may provide various privacy controls. When a plurality of users indicates an interest in meeting, in one embodiment, the system selects an optimal place to meet up. The term optimal, as used in the present application means "the best compromise among several often conflicting requirements, as in engineering design" rather than making perfect, as true perfection is unlikely to be achieved.

In one embodiment, the optimal place is selected in part based on the current locations of the users. In one embodiment, the optimal place to meet up may be a place that is approximately equidistant from all users. In one embodiment, the optimal place to meet up may be a place that is approximately an equal travel time from all users. In one embodiment, this calculation may take into place the relative location of the user compared to their known parking location. In one embodiment, this calculation may take into place the users' known preferences as to meeting sites. In one embodiment, the users may indicate their interest to meet for coffee, drinks, dinner, etc., and the optimal place determination may utilize that information to select a destination to meet. In one embodiment, the system may present a plurality of options and enable the users to jointly select the actual location to meet. In one embodiment, the system may use historical location data of the users, or their friends, to help select the meeting site.

The system may in one embodiment automatically generate directions for one or more of the users. In one embodiment, the system may provide cross-notifications to all users when a user is on his or her way. In one embodiment, the system may provide an expected time of arrival (ETA) for each user. In one embodiment, the system may provide an alarm to inform the user that it is time to depart, to synchronize ETAs. In one embodiment, if appropriate, the system may automatically make a reservation at the selected meeting site, based on the estimated time of arrival and number of attendees.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1 is a block diagram of the network in which one embodiment of the system may be implemented. The network 120 connects together various users (110A, 110B) and optionally servers and systems which may be used to provide services to the users. The network 120 may include a cellular telephone network, a wireless Internet network, a wired network, or any other communication means that enables users to communicate with each other, either directly or through a server.

The users 110A and 110B may be coupled to different networks which are not separately shown. For example, user A (110A) may be using a mobile phone, and coupled to a carrier network, while user B (110B) may be using a tablet computer and be coupled to the Internet via a Wi-Fi network. For simplicity, the connections between such networks are not illustrated, as they are well known in the art.

In one embodiment, the user systems (110A, 110B) may receive user location data. This user location data may be based on global positioning system (GPS) data if the user's device is capable of receiving such data, network triangulation data if the user's device is coupled to a cellular network, wireless network data if the user's device is able to receive wireless network data. In one embodiment, multiple sources of location data may be used to obtain a more accurate positioning of the user. Other means of obtaining location information may be used. User location data may be obtained from another server or application, where the user has checked in, or otherwise indicated his or her location.

The user's system is coupled to a network, to enable the user to share information with other users. In one embodiment, this may occur over a P2P (peer-to-peer) connection, or via a meeting server 130. The meeting server 130 in one embodiment provides information to user systems to enable the users to set up a friend meeting. In one embodiment, the functionality of the meeting server 130 may be incorporated into a client-side application residing on the user systems 110A, 110B. In one embodiment, the sharing is provided through a separate system, such as the check-in or location-based systems discussed above.

In one embodiment, the system further includes a routing system 150, which may be within meeting server 130, user systems 110A, 110B, or as a stand-alone server 150 or application. The routing system 150 receives location data from a plurality of user systems, and a destination data, and provides routing information, and in one embodiment estimated time of arrival information to each of the users.

The system may further include destination site data 140. Destination site data 140 may be within meeting server 130, user systems 110A, 110B, or as a standalone database or other storage and retrieval mechanism 140. Destination site data 140 provides information about potential destinations for a meeting. In one embodiment, destination site data 140 may be a service provided by another system, such as a review site or mapping program which includes data about potential meeting sites.

Note that while only two users are shown (110A, 110B) the number of users who may connect to each other is not limited. In one embodiment, the meeting server 130 provides the system to communicate between users. In another embodiment, an existing service may be used, and the present system may provide the ability to select a meeting site and provide guidance to the meeting site.

Figure 2:
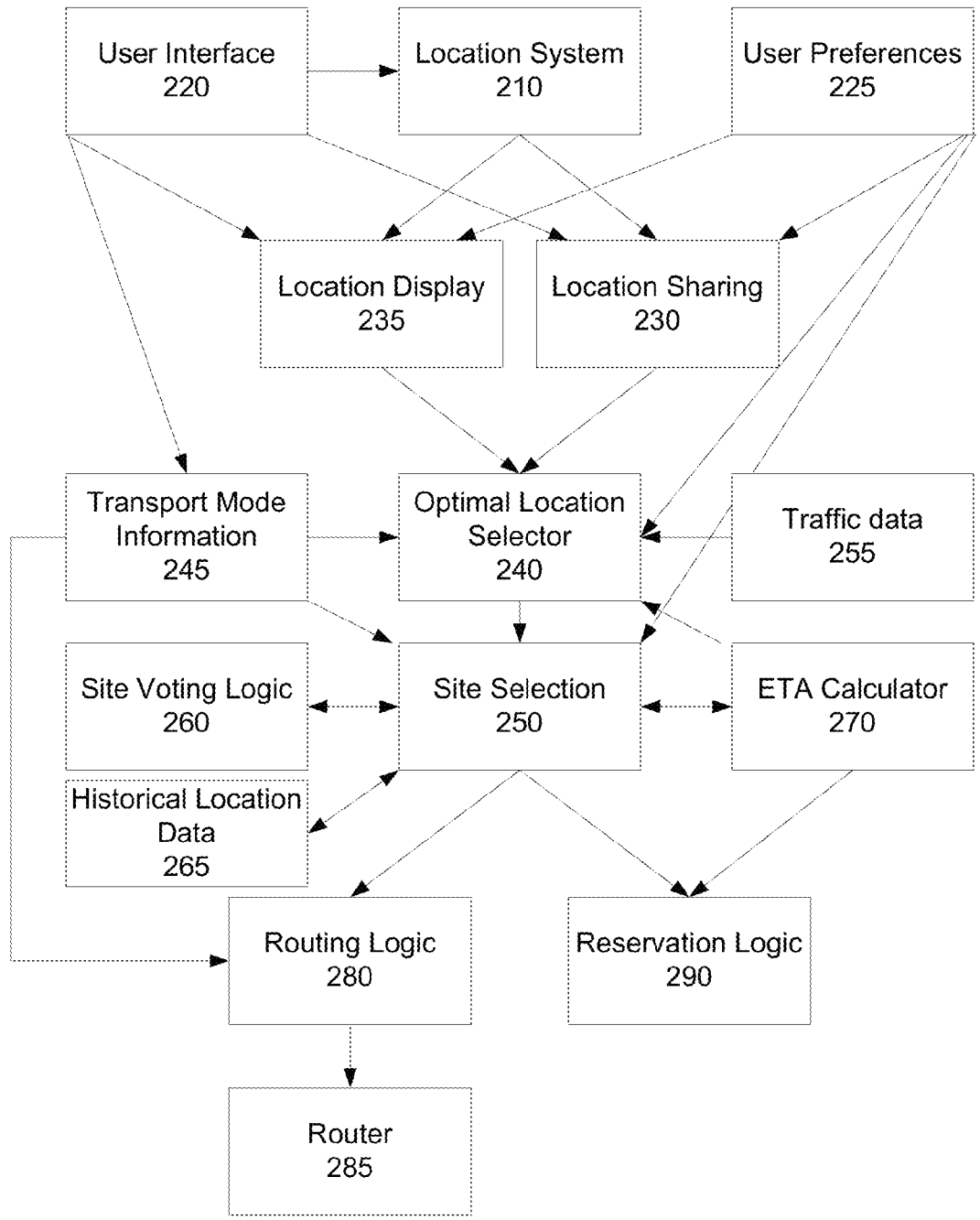
FIG. 2 is a block diagram of one embodiment of a meeting system.

FIG. 2 is a block diagram of one embodiment of a location service system. The system includes user location system 210. The user location system receives user location data. In one embodiment, user location data may be received from various sources including a GPS sensor, network location sensor, cellular tower triangulation, or via user input. In one embodiment, enabling user input to determine location permits a user to correct location data, when it is in error, and enables a user to explore a potential destination as well. In one embodiment, the user may input his or her location, or future location, via user interface 220.

The user's location is shared with others via location sharing 230. In one embodiment, the user's preferences 225 control with whom the user location is shared. In one embodiment, location sharing is controlled by a central server. In another embodiment, this process may be entirely peer-to-peer without any server involvement. The user may alter or set preferences via user interface 220. In one embodiment, a default set of preferences are available.

Location display 235 shows the locations of others, on the user's system. Which users are shown depends on user preferences 225. The user may alter the preferences via user interface 220. In one embodiment, toggling between various preferences is very simple.

Users may decide to meet, by interacting with the location display 235, via user interface 220. Once users indicate an interest in meeting, optimal location selector 240 determines an optimal location for meeting. In one embodiment, the optimal location may depend on user preferences 225, the locations of the users who want to meet, and transport mode information 245. In one embodiment, transport mode information may be provided manually by the user. In one embodiment, transport mode information 245 may be deduced based on the user's recent modes of travel. In one embodiment, traffic data 255 may also be considered when selecting the optimal location. Traffic data 255 may be obtained from various sources including real time traffic providers, or analysis of historical traffic patterns.

Once the optimal location selector 240 determines where to meet, site selection 250 identifies a proposed meeting site. The proposed meeting site may be selected from locations within a particular radius of the optimal location identified by optimal location selector 240.

In one embodiment, site selection 250 may also take into account historical location data 265. Historical location data 265, in one embodiment, is the location data obtained from one or more networks, such as social networks, review networks, etc. indicating the user's past preferred locations and the user's friends' past preferred locations. In one embodiment, the selecting a particular meeting site may take into account the historical location data of each of the users who will be meeting. For example, if most of the users' location/check-in data reflects a preference for a particular brand of coffee shop, or restaurant, or type of food, the site selection 250 may be able to use this information to select a meeting site.

In one embodiment, site voting logic 260 enables users to choose an actual meeting site. If multiple proposed meeting sites are provided, users may rank the proposed meeting site via site voting logic 260. Site voting logic then selects the actual meeting site, based on the votes by users.

Routing logic 280 provides routing information to users, if appropriate. In one embodiment, routing information is only provided to a subset of users who have a user system which can show routing information. Router 285 takes the information from routing logic 280 and generates turn-by-turn directions, in one embodiment. These turn-by-turn directions transform the real-world data of city streets into a visual representation displayed to the user.

ETA calculator 270 enables the sharing of estimated arrival times among the users. This enables coordination of meetings. In one embodiment, reservation logic 290 may automatically make a reservation, at the estimated time of arrival, for the appropriate number of users. In one embodiment, reservation logic 290 interacts with an external system which actually makes the reservation.

Note that while general interconnections between the logical functions provided by the computer system are shown, just because a connection is shown does not necessarily mean that data from one logic is sent to another. Similarly, just because no connection is shown does not imply that no data can be transferred between the logics in question.

Figure 3:
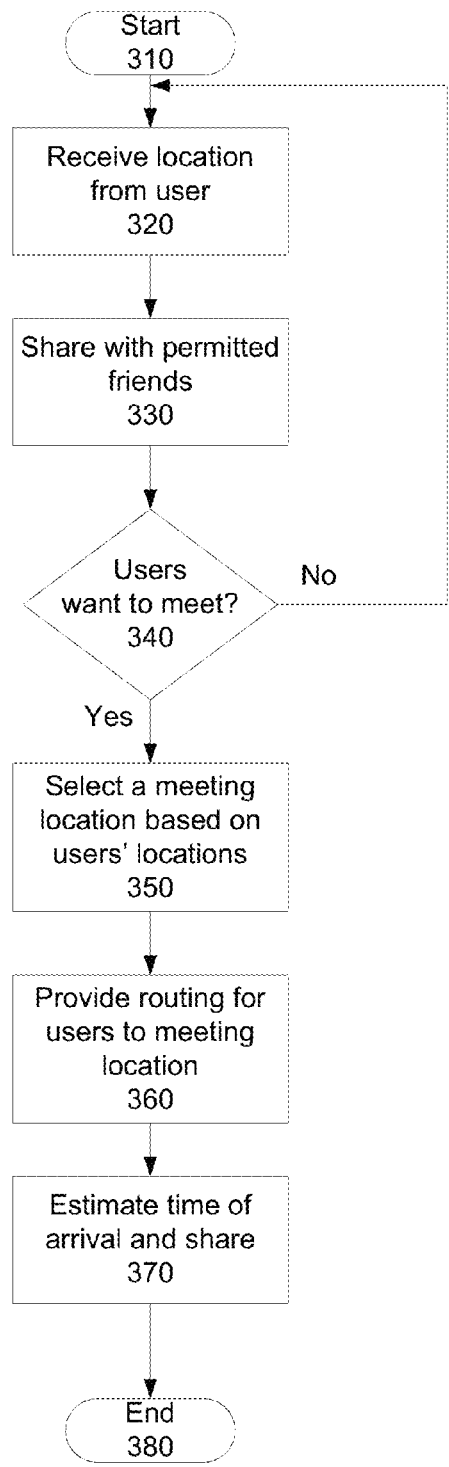
FIG. 3 is an overview flowchart of one embodiment of the system.

FIG. 3 is an overview flowchart of one embodiment of the system. The process starts at block 310. In one embodiment, this process is active whenever the application providing user location services is active on a user device. In one embodiment, the application may be active even if the user's device does not provide direct location services. The user may enter his or her own location manually, in one embodiment.

At block 320, user location data is received. In one embodiment, this data may be received from a GPS chip, a network signal receiver, a triangulator, a wireless network connection system, or similar device. In one embodiment, it may be entered by a user manually.

At block 330, this data is shared with permitted friends. In one embodiment, the user may authorize a group of people to receive their location information. In one embodiment, the group of individuals who receive such data may be, for example, close friends, coworkers, etc. In one embodiment, the user may manually select those individuals who are authorized. In one embodiment, the user may publish his or her location to everyone, e.g. set permissions to "all." Note that although the term "friend" is used here, it is merely used to designate a relationship between the users. The present system can be used to share location data with friends, coworkers, and even people the user has never met before. The system may be used in one embodiment, for example, in a dating service configuration, to show locations of individuals of potential interest, to enable informal, spur of the moment meetings.

At block 340, the process determines whether the users wish to meet. In one embodiment, the user may indicate an interest in meeting one or more others, based on their data within the system. For example, in one embodiment, the user may touch the icons of those users whom he or she is interested in meeting. Other methods of selecting users or indicating an interest in meeting may be used. In order for the "users" to want to meet, at least two users express an interest in meeting each other.

If the users do not wish to meet, the process returns to block 320, to continue receiving updates to user location data, and share it. In one embodiment, the system determine whether there is a change in the user location, and only changes in user location are sent to others. That is, if the user remains in one location, his or her location data is only sent once.

If the users do wish to meet, at block 340, the process continues to block 350. Note that while this is illustrated as a separate portion of the flowchart, in one embodiment, each user's location continues to be monitored, and updates are sent to friends, even while other services are provided.

At block 350, the system selects a meeting site based on the users' current location. This meeting site may be selected based on various criteria, including user preference, distance, traveling methods of the users, estimated times of arrival, etc.

At block 360, routing is provided for the users to the meeting site. The routing may, in one embodiment, include routing for driving, bicycling, taking public transit, walking, or another mode of transport. In one embodiment, the user may indicate his or her mode of travel, and the appropriate routing format is provided. In one embodiment, this information is also taken into account when selecting a meeting site.

At block 370, the system estimates a time of arrival at the meeting site for each of the user. This information may be shared with all other users. In another embodiment, the system shares a "last person arrival" data only. For example, the data shared may indicate that "Everyone in your party will be at the meeting site in 15 minutes." Alternative methods of providing data, including real-time updating of location information during the time of travel, may be provided. The process then ends at block 380.

Figure 4:
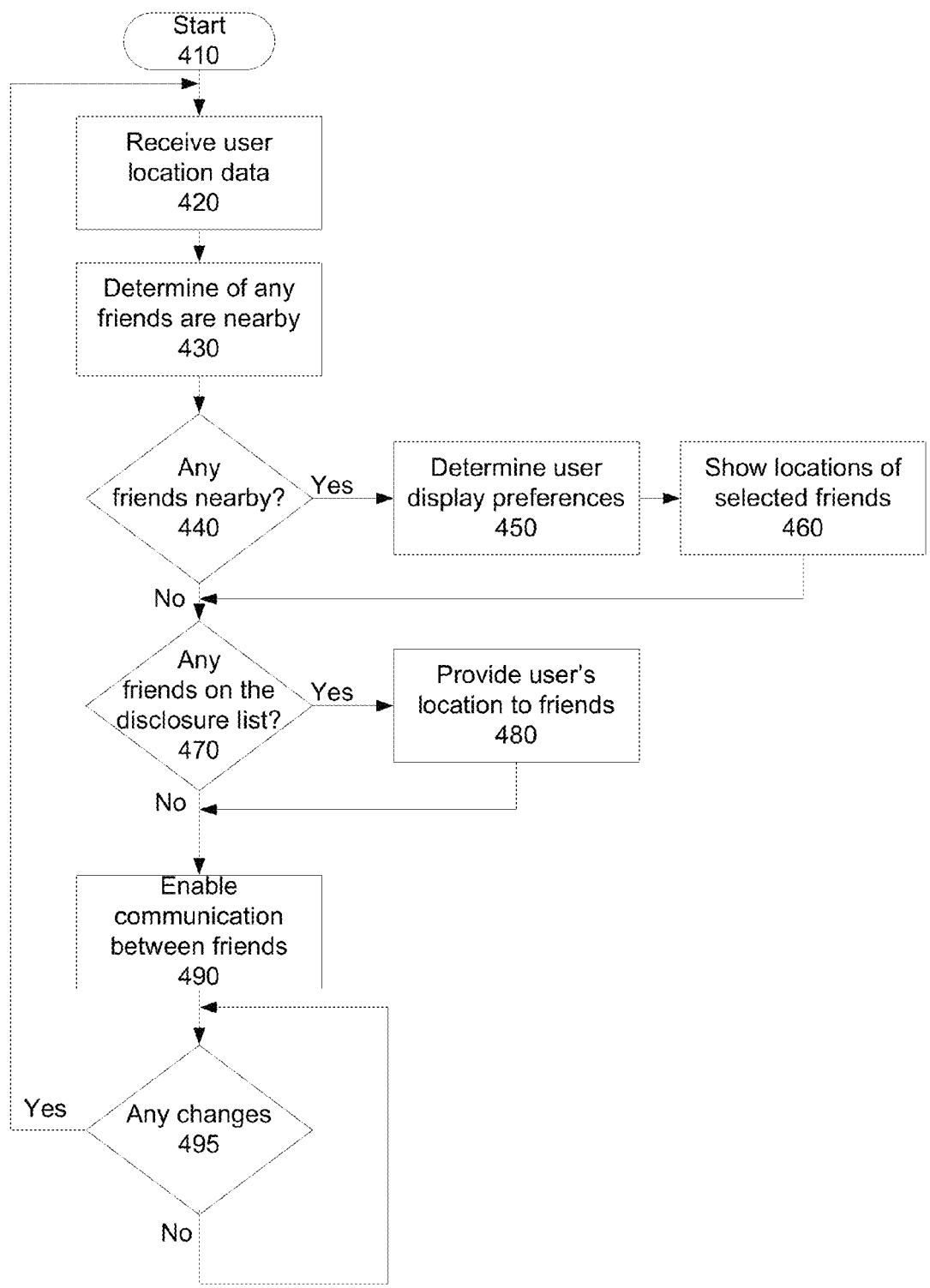
FIG. 4 is a flowchart of one embodiment of sharing locations.

FIG. 4 is a flowchart of one embodiment of sharing locations. The process starts at block 410. In one embodiment, this process corresponds to blocks 320-340 of FIG. 3.

At block 420, the user's location data is received. The data may be received by a client application on the user's device, at a mapping server, or both. In one embodiment, the user's location data may be manually selected by the user.

At block 430, the process determines whether any friends of the user are nearby. A friend, in this context, is anyone who has indicated that he or she wishes to share their location with the user. This may include, in one embodiment, third parties who are not known to the user, but who are sharing their location with the world. This may include, in one embodiment, friends of friends. Nearby, in this context, may mean within the same neighborhood, within walking distance, within driving distance, or within the map area selected by the user. In one embodiment, the user may zoom in and out of the map area, and thereby set the definition of "nearby" for the process. In one embodiment, the system may the ability to select walking distance, short transit distance, to display the corresponding map zoom level and associated local friends. At block 440, the determination is made whether there are any friends nearby. If so, the process continues to block 450.

At block 450, the process determines the user's display preferences. In one embodiment, the user may set preferences for what to display, e.g. everyone available, only friends, only friends and friends of friends, only people who are members of the same group, etc. In one embodiment, the system provides an easy way to set this display preference, to toggle through the various groups which the user may wish to see. For example, the user may categorize "friends" and view each category individually. For example, a default set of categories may be: close friends, friends, coworkers, members of social network, group members (may be separated by group), and strangers. The user may choose to see one or more of these categories concurrently.

At block 460, the friends who are members of the group(s) which the user wishes to display are shown to the user. In one embodiment, this may be a map display, as shown in FIG. 8A. In another embodiment, this may be a list display, with the various distances shown. In one embodiment, the user may toggle between various display formats. In one embodiment, the user preferences may order the displays (e.g. preferential close friends, if no close friends, then other friends, if no other friends then coworkers, etc.) In that instance, in one embodiment, the highest ranked group having at least one member within the user's location range is selected for display. In one embodiment, all friends are displayed, and are coded by group membership. For example, in one embodiment, the selected group's members are shown with larger icons and names, while the other groups' members are shown as pins or other smaller indications on the display.

The process then continues to block 470. If no friends were found nearby, the process continues directly to block 470.

At block 470, the process determines whether the user will be disclosing his or her location to any friends. As noted above, the term friends may include anyone including strangers, as set by the user's preferences. FIG. 8D shows an exemplary screen with user preferences. If soothe user chooses to disclose his or her location, at block 480, the user's location is provided to the designated categories of friends' systems. As noted above, it may or may not be displayed, depending on the preferences of those friends. The process then continues to block 490.

At block 490, communication is enabled between the friends shown. In one embodiment, the communication may be based on instant messaging-like communication formats. In one embodiment, the communication may be based on short messaging system (SMS), multimedia messaging (MMS), email, or other communication. In on embodiment, enabling communication means that the user can send a message with a single click, or otherwise very simply.

At block 495, the process determines whether there are any changes to the user's location, preferences, or friends' locations. If so, the process returns to block 420 to again process this information. In one embodiment, only changes are processed, e.g. a new friend is added to the display, but existing data that remains the same is maintained. This reduces bandwidth, which can be useful when the user is on a slow network. The system continues to monitor for change at block 495, while the application is active.

Figure 5:
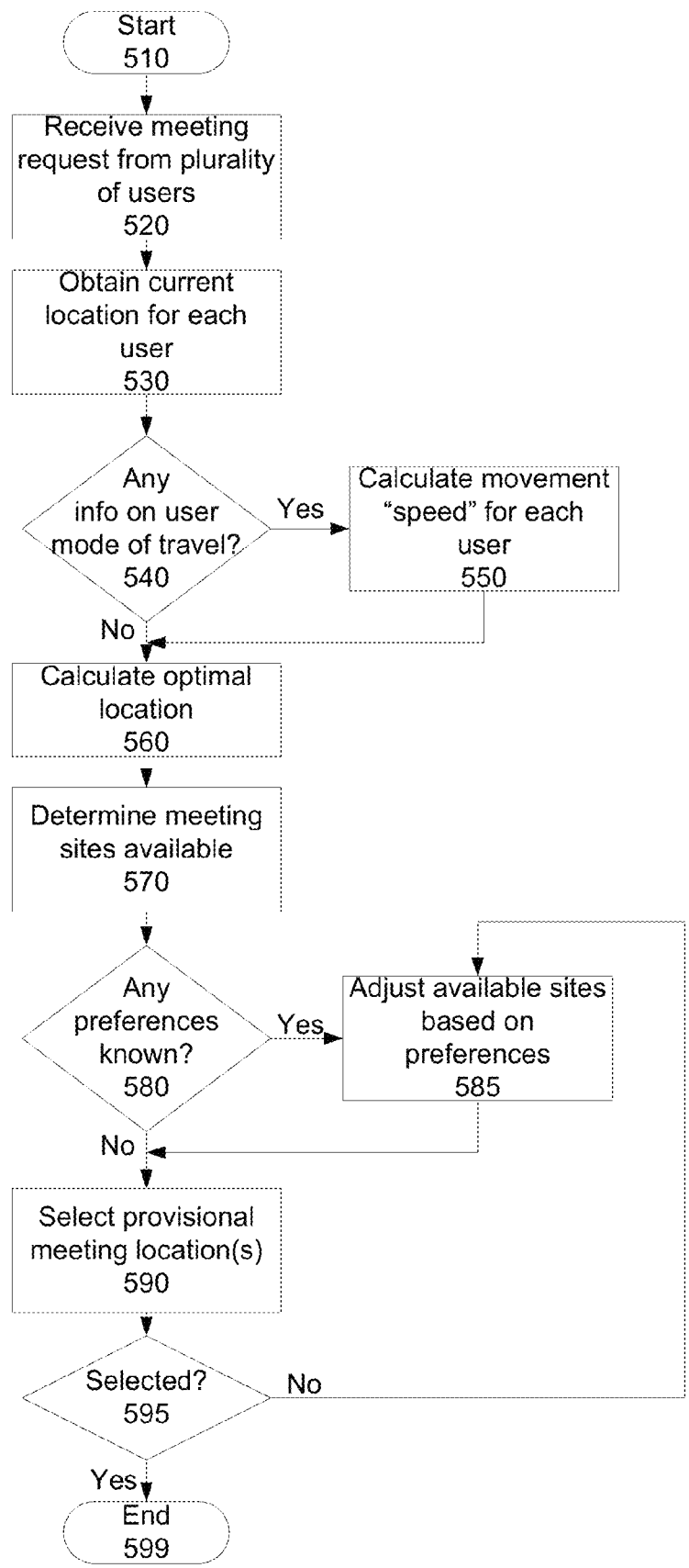
FIG. 5 is a flowchart of one embodiment of selecting a destination.

FIG. 5 is a flowchart of one embodiment of selecting a destination. The process starts at block 510. In one embodiment, this process corresponds to block 350 of FIG. 3.

At block 520, a meeting request is received from a plurality of users. In one embodiment, a user can indicate an interest in meeting one or more friends on their device. This interest is conveyed to those friends. If they indicate a desire to meet as well, a meeting request is generated.

At block 530, the current location of each of the users is obtained. In one embodiment, this data is already in the system.

At block 540, the process determines whether there is any data on user mode of travel. In one embodiment, users may have various modes of travel including cars, bicycles, walking. In one embodiment, the mode of travel information also includes restrictions on movement. For example, a user may be in a wheelchair. In one embodiment, if this is indicated the system would take into consideration the speed of travel available for wheelchair-using users, and also any location restrictions, e.g. the selected meeting site should not be a second story without an elevator, or at the top of a steep hill.

If there is information about mode of travel, at block 550 the system calculates a movement speed for each user. This may range from 30 mph for a user in a car in a city to an average 10 mph for a user on busses, or 3 mph for a walking user. In one embodiment, if no information is available to the system, the system assumes that the user has a vehicle available. In one embodiment, the system may utilize statistical data of past user movements to determine a likely mode of travel. In one embodiment, where available the system interacts with a motion monitoring logic, for example a system such as the one described in co-pending U.S. application Ser. No. 12/069,267, filed on Feb. 8, 2008, and entitled "Human Activity Monitoring Device With Activity Identification." In that case, the system can identify whether the user has been walking, bicycling, or driving in a vehicle. This information may, in one embodiment, be used to identify a mode of travel. For example, if the user had been using a bicycle since he or she left home, it is unlikely that the user would suddenly switch to public transit or a car.

At block 560, an optimal location is calculated. The optimal location, in one embodiment is calculated based on an estimated time of arrival of each user to the location. In one embodiment, the optimal location is a geographic position, defined by a latitude and longitude. For example, the optimal location may be significantly closer to a walking user than a driving user. In one embodiment, the system may take into account parking, when selecting an optimal location. That is, the time of a driving user to travel from an available parking location to the optimal location is taken into account when determining an estimated time of arrival. In one embodiment, traffic is taken into account when determining travel time. In one embodiment, traffic may be real time traffic data. In one embodiment, traffic may be estimated traffic patterns based on historical data.

The term optimal, as used to designate a location, means "the best compromise among several often conflicting requirements, as in engineering design." These requirements may include travel time and travel cost for each user, availability of meeting sites, and other factors.

At block 570, the system determines meeting sites available at the optimal location. In general, a meeting site is not a street corner but rather a business, such as a coffee shop, restaurant, wine bar, etc; a park or similar open-air location; or a point of interest, such as a museum or the like. Other types of meeting sites may also be set. In one embodiment, searching for a meeting site uses an algorithm that defines a search radius, and then searches. In one embodiment, if there are not at least a preset number of results, the search radius may be increased. In one embodiment, the preset number is three. In one embodiment, the search radius may be flexible. In one embodiment, the search radius may be defined based the population density of the optimal location, where more densely populated areas have a smaller search radius.

In one embodiment, at block 580, the process determines whether the users have expressed a preference regarding meeting sites. In one embodiment, users may set their preferred meeting site type, e.g. "meet for dinner" v. "meet for coffee" or "meet for a walk." In one embodiment, preferences may be extremely specific (e.g. STARBUCKS® coffee shop) or very broad (e.g. restaurant, or even inside/outside.

FIG. 8D shows an exemplary user preference setting indicating a meeting location preference. In one embodiment, this may be set per-meeting, globally, etc. In one embodiment, the system has a default set of preferences. For example, the default set of preference is to meet at a coffee shop during non-dining hours and at a restaurant during standard dining hours. In one embodiment, the preference may be derived from historical location data, as described below with respect to FIG. 6.

Returning to FIG. 5, if there is a preference, at block 585, the process trims the available meeting sites based on the user preferences.

At block 590, one or more provisional meeting sites are presented to the users, and the users can select one of the provisional meeting site.

In one embodiment, the results suggestions from the system can have temporal components. Temporal components may be time restricted. For example, users may select a movie as their meeting site. In one embodiment, results can span different movies, different theaters and different show times. Similarly, users may wish to meet for a happy hour, which may have different times at different potential meeting sites.

Figure 8B:
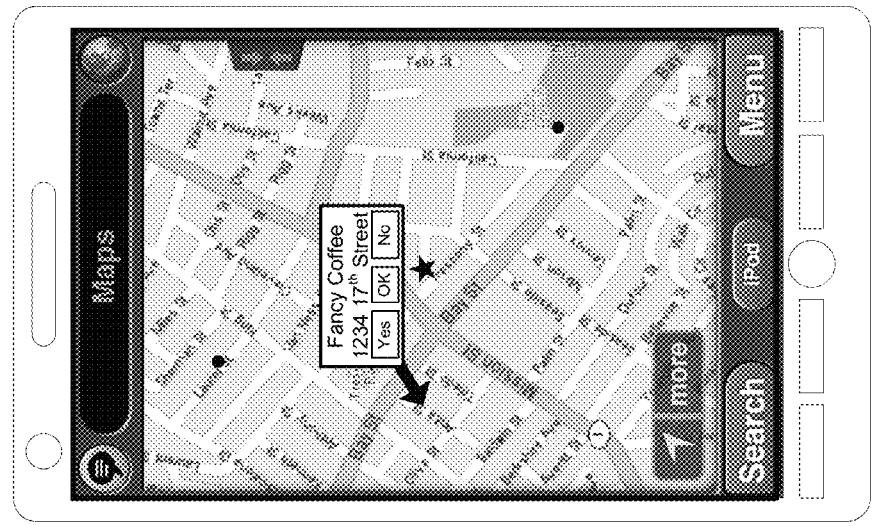
FIGS. 8A-8D are exemplary screen shots.
Figure 8A:
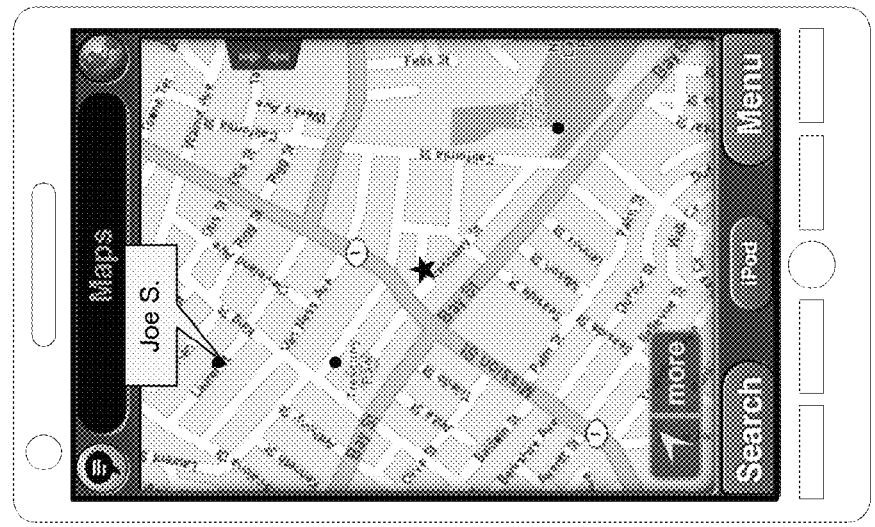
Figure 8D:
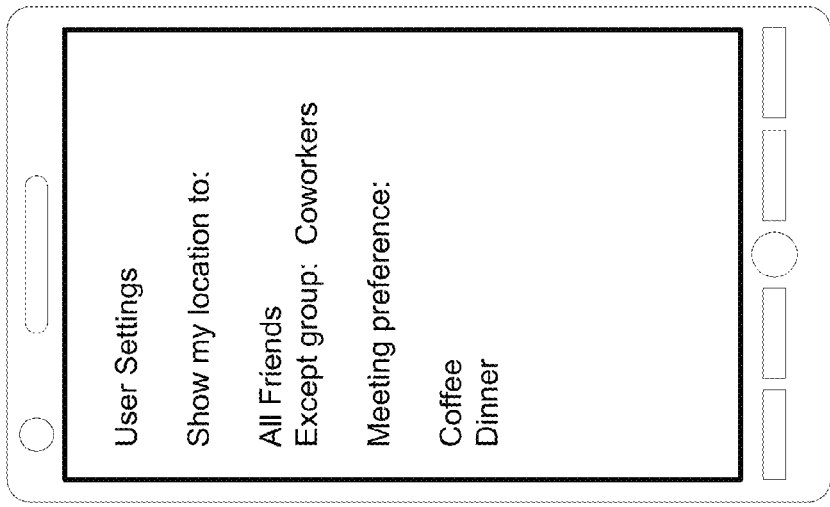

FIG. 8B illustrates one embodiment of a provisional meeting site which is shown to a user. In one embodiment, the users may accept or reject the provisional meeting site.

The user's decision regarding the meeting sites is received, at block 595. In one embodiment, a single provisional meeting site is provided, which the user may accept or reject. In another embodiment, multiple options for meeting sites may be presented. In that embodiment, each user may rate each provisional meeting site. In one embodiment, the rating scale may be from 1 to 5 (1 indicating best, 5 worst). The system then tallies the votes and picks the highest score as the winner. If it's a tie, in one embodiment the system randomly picks the winner. In another embodiment, if it's a tie, the meeting site with the highest low score is selected. In one embodiment, the system automatically removes any option which receives the lowest rating from any user.

If the users approve the provisional meeting site, or it is selected based on the vote, the process of selection ends, at block 599. If the provisional meeting sites are all rejected, the process continues to block 585, to adjust the available sites, based on this further preference indication. In one embodiment, adjusting the available provisional sites may include increasing the search radius. In one embodiment, the rejection may provide a reason, e.g. dislike restaurant, don't want to meet at a coffee shop, etc. In one embodiment, this preference data is stored. The process then returns to block 590 to select a new provisional meeting site.

Figure 6:
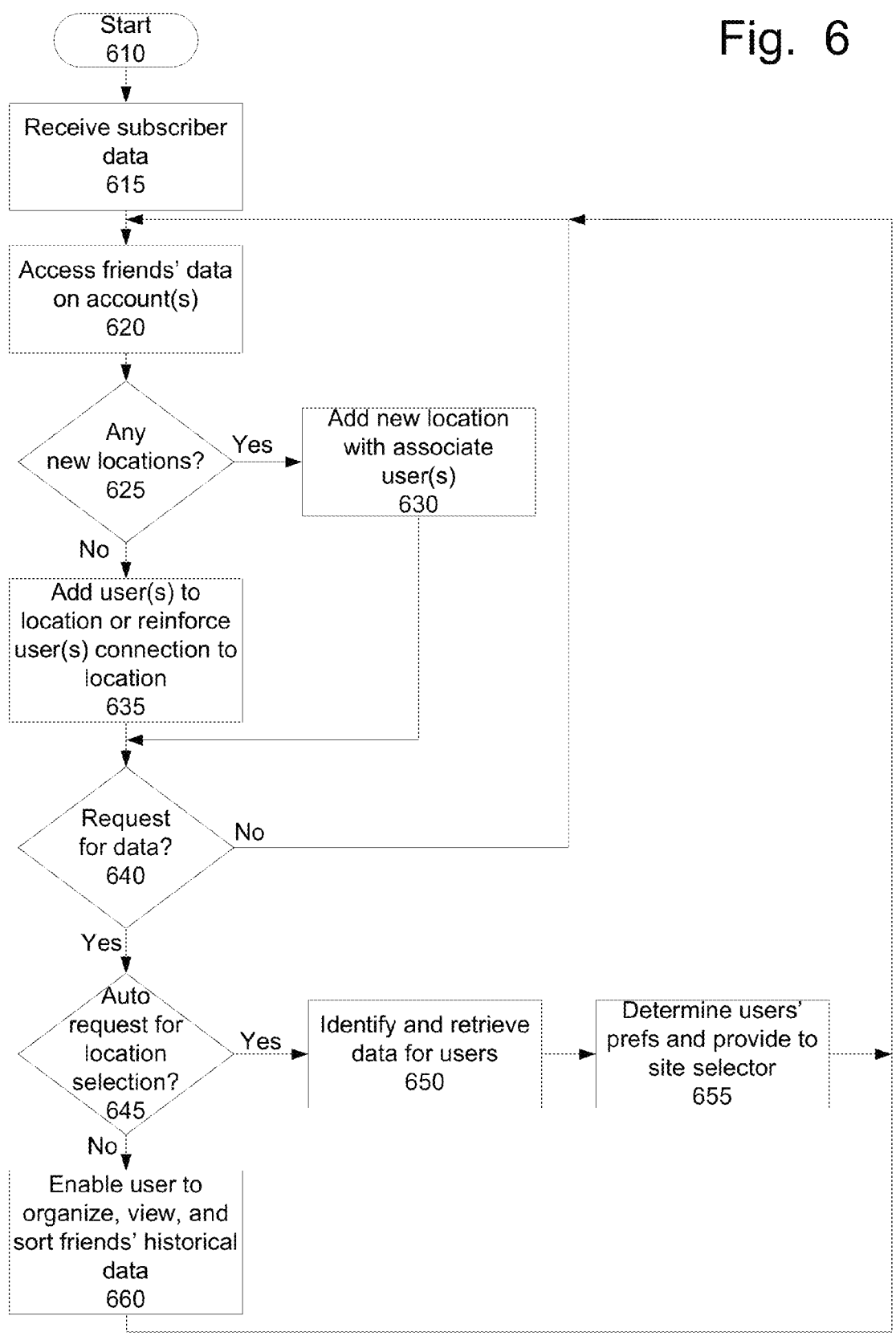
FIG. 6 is a flowchart of one embodiment of enabling a user to use historical data for meeting site selection.

In one embodiment, the users may connect their system to a social network, which enables checking into locations, such as FACEBOOK PLACES™ and YELP™ and FOURSQUARE™. In one embodiment, the user may provide access to these networks to the system. FIG. 6 illustrates one embodiment of using the data from such a social networking or other location-providing site.

The process starts at block 610. In one embodiment, this process may be active whenever there are one or more users who have connected their systems to a social networking site which provides check-in abilities.

At block 615, the process receives subscriber data. This occurs, in one embodiment, when a user links a location-based account to the system. The account may be on a social network which provides the ability to rate or check-in with locations or providers, or on a different system that permits access to the preferences of the user's friends and/or associates. This may include primarily review sites, such as YELP™ or CITYSEARCH™, as well as primarily check-in sites such as FOURSQUARE™ and FACEBOOK PLACES™ or primarily location sites such as GOGGLE MAPS™ or TOMTOM GPS™ or a location based mobile social networking site such as LOOPT™.

At block 620, the user's network is polled to access friends' location and/or review data. In general, check-in/location data is only available for a limited time. Therefore, the system obtains a copy of the data. In one embodiment, the period for polling may depend on the length of period a particular system maintains data.

At block 625, the process determines whether there are any new locations in the friends' location/review data. If so, at block 630 the new location is added to the system, along with the associated users, in one embodiment. If, on the other hand, the location is already in the system (e.g. someone else has previously reviewed/checked-in at a particular location, at block 635 the user(s) are added to the locations(s). In one embodiment, if a user visits a location multiple times, this is tracked as well, by strengthening the association between the user and the location. In one embodiment, in addition to the location (e.g. store at a particular address) the system also tracks the frequency or strength of connection between a user and a location. Note that the term "location" may refer to a store, a restaurant, a park, or any other place where a user may provide his or her location data.

At block 640, the process determines whether a request for data was received. The request for data requests some of the data stored in the system. This request may be originated by the user, in one embodiment. This request may be originated by the system without the user's interaction, in one embodiment. If no such request for data was received, the process continues to block 620 to continue polling the networks to access friends' location data. If a request is received, the process continues to block 645.

At block 645, the process determines whether the request was an automated request. An automated request may be made by the system when the user requests a selection of locations. This may be done in the system described above, where the user requests a meeting with one or more users. This may be done, for example, when the user requests a recommendation for a "popular" location.

If the request was an automatic request, the process, at block 650 identifies the relevant users, and retrieves data for those users. The relevant users, in one embodiment, are the users who are going to meet, if this is in the context of selecting a meeting location. The relevant users, in on embodiment, are those friends of the current user who have similar tastes, in one embodiment. The data retrieved, in one embodiment, is selected for the appropriate user preferences, e.g. for coffee shops if the user is looking for a coffee shop, or for open restaurants if users want to go to a restaurant.

At block 655, the users' preferences are determined, and provided to the site selector. The site selector can then present the top choices to the user. The process then continues to block 620 to continue polling the networks to access friends' location data.

If, at bock 645 the process determined that the request was not automatic, the process continues to block 660. At block 660, the system enables the user to organize, view, and sort friends' historical location data. For example, the system may enable the user to organize the data by any of the following variables for example:
Date
Proximity
Friends
Name of check-in
Coupons For example, the system provides the ability to see the user's friends' locations/check-ins that are around the user's location or the location the user is viewing. In one embodiment, the system further provides the ability to view associated data, which may include pictures, videos, comments, or other data associated with the location by the user. The user may then sort the data, for example by viewing the locations/check-ins of a certain friend whose taste in restaurants/museums/coffee shops/etc. matches the user's. This process can be used, in one embodiment, to select a meeting location, or to select a location for the user to visit.

Figure 7:
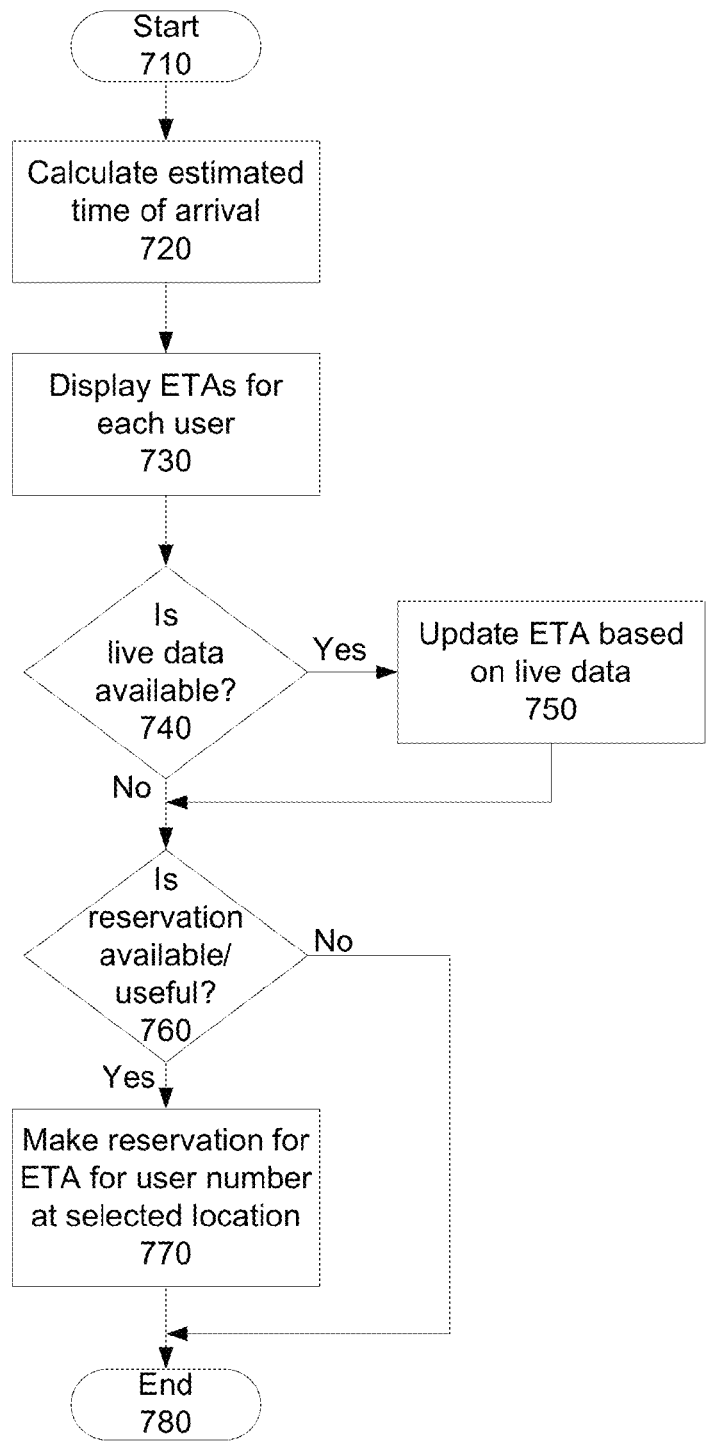
FIG. 7 is a flowchart of one embodiment of calculating an estimated time of arrival.

FIG. 7 is a flowchart of one embodiment of calculating an estimated time of arrival. In one embodiment, the system utilizes this information in selecting a meeting site. In one embodiment, the process further provides this information to the users meeting. In one embodiment, this process corresponds to block 370 of FIG. 3. In one embodiment, this process starts when the users agree on a meeting site.

At block 720, the estimated time of arrival for each user is calculated. The estimated time of arrival is based on the user's location and the meeting site, and if available the mode of travel for the users.

Figure 8C:
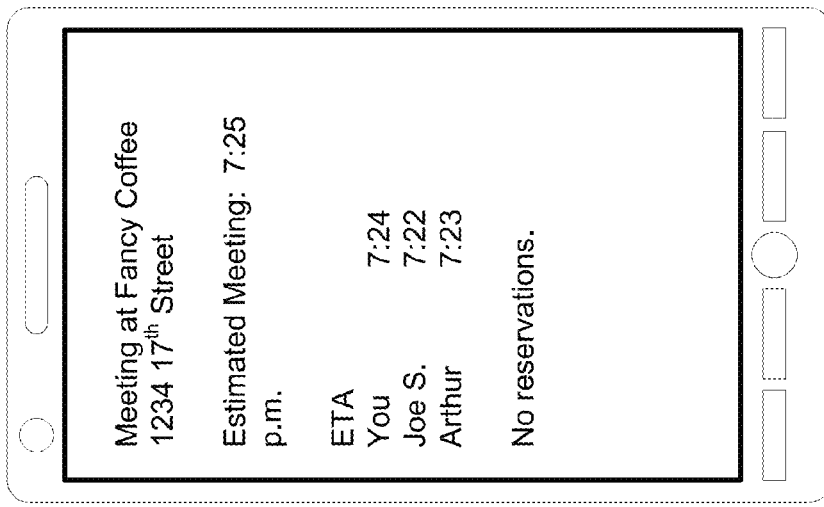

At block 730, the estimated time of arrival is displayed. FIG. 8C shows an exemplary display which may be used to convey the estimated time of arrival. In one embodiment, an estimated time of arrival is shown for each user. In another embodiment, the estimated time of arrival for the last user to arrive is shown.

At block 740, the process determines whether live location data is available. If so, in one embodiment the live location data is used to update the estimated time of arrival at block 750. In one embodiment, the live location data may be processed to calculate a user's travel speed, and travel mode. This can then be used to reevaluate the estimated time of arrival.

At block 760, the process determines whether a reservation is available and/or useful for the selected meeting site. In general, reservations can be useful for clubs, dining establishments, etc. In contrast, no reservations may be available for coffee shops or museums. If a reservation is available and useful, the process at block 770 automatically places a reservation for the estimated time of arrival, for the user number known. In one embodiment, a third party application may be used to place the reservation. There are numerous such applications, such as OpenTable™ and others. In another embodiment, the reservation feature may be implemented within the system itself. In one embodiment, the users are informed of the reservation, or lack of reservation. FIG. 8C illustrates an exemplary screen which shows the estimated times of arrival, and the reservation status. The process then ends, at block 780. In this way, the user's meeting site and convenience is optimized.

Figure 9:
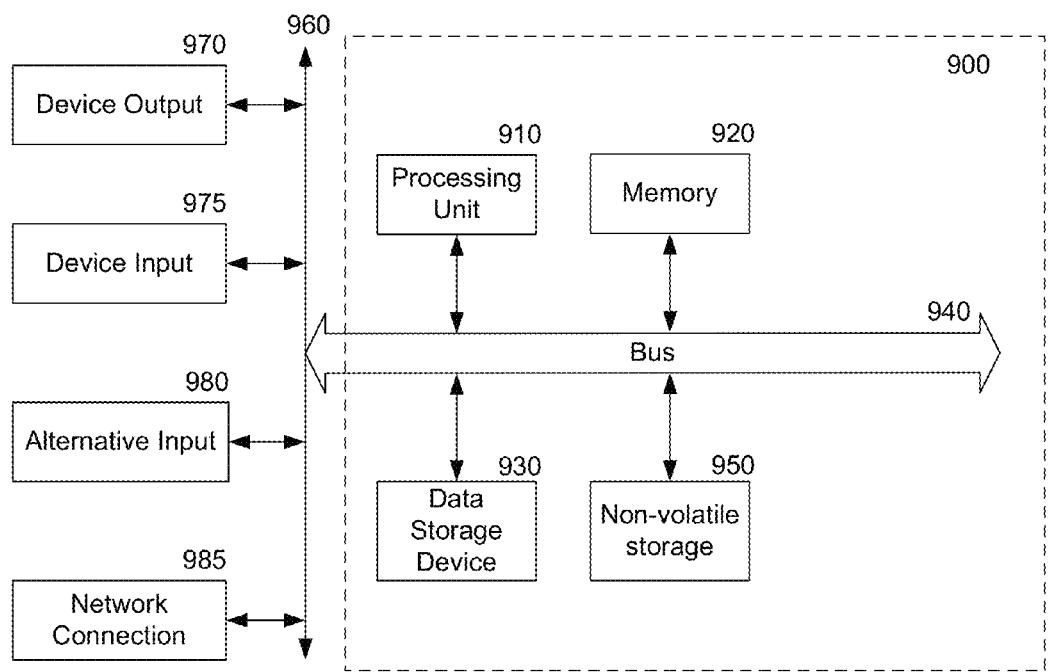
FIG. 9 is a block diagram of a computer system which may be used with one embodiment of the present invention.

FIG. 9 is a block diagram of a particular machine which may be used with the present invention. It will be apparent to those of ordinary skill in the art, however that other alternative systems of various system architectures may also be used.

The data processing system illustrated in FIG. 9 includes a bus or other internal communication means 940 for communicating information, and a processing unit 910 coupled to the bus 940 for processing information. The processing unit 910 may be a central processing unit (CPU), a digital signal processor (DSP), or another type of processing unit 910.

The system further includes, in one embodiment, a random access memory (RAM) or other volatile storage device 920 (referred to as memory), coupled to bus 940 for storing information and instructions to be executed by processor 910. Main memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910. In one embodiment the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

The system may further be coupled to an output device 970, such as a cathode ray tube (CRT) or a liquid crystal display (LCD) coupled to bus 940 through bus 960 for outputting information. The output device 970 may be a visual output device, an audio output device, and/or tactile output device (e.g. vibrations, etc.)

An input device 975 may be coupled to the bus 960. The input device 975 may be an alphanumeric input device, such as a keyboard including alphanumeric and other keys, for enabling a user to communicate information and command selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and command selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, wireless network or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine which embodies the present invention may be configured in various ways according to the particular implementation. The control logic or software implementing the present invention can be stored in main memory 920, mass storage device 930, or other storage medium locally or remotely accessible to processor 910.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a handheld or portable device containing a subset of the computer hardware components described above. For example, the handheld device may be configured to contain only the bus 940, the processor 910, and memory 950 and/or 920.

The handheld device may be configured to include a set of buttons or input signaling components with which a user may select from a set of available options. These could be considered input device #1 975 or input device #2 980. The handheld device may also be configured to include an output device 970 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 910, a data storage device 930, a bus 940, and memory 920, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 985.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 910. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
sharing a current location of a user with a subgroup of contacts, the subgroup of contacts selected by the user, based on a user preference;
providing a display of friends in a local area to the user, the friends representing contacts who have chosen to share their current location with the user;
enabling the user to send a request to meet one or more of the friends shown in the display;
calculating an optimal location for a meeting based on the current location of the user and the current location of the one or more friends, the optimal location having approximately equal travel time for the user and the one or more friends based on mode of transportation, the travel time including drive time from the driving user's current location to a parking location, and time to get from the parking location to the optimal location; and
upon acceptance of the request by one or more of the friends, providing guidance to the user to the meeting.

2. The method of claim 1, further comprising:
selecting a meeting site near the optimal location, wherein providing the guidance to the meeting comprises providing directions to the meeting location, the directions depending on the mode of transportation of the user.

3. The method of claim 2, wherein selecting the meeting site takes into account historical location data obtained from a network, indicating past locations of the user or of friends of the user.

4. The method of claim 1, further comprising:
enabling the user to select a subgroup of friends to display to the user.

5. The method of claim 1, wherein the subgroup of contacts with whom the user's location is shared comprises one of: a selected subgroup of friends, members of a social group, members of a work-related group, and strangers.

6. The method of claim 1, wherein the optimal location is optimized based one or more of: distance, time of travel, user preferences.

7. The method of claim 1, further comprising:
wherein the estimated time of travel for the user includes time to get to the mode of transportation from the user's current location.

8. The method of claim 7, wherein the estimated time of travel takes a current level of traffic into consideration for drivers.

9. The method of claim 1, further comprising:
providing a proposed meeting site, and enabling a user to approve or reject the proposed meeting site.

10. The method of claim 1, further comprising:
providing a plurality of proposed meeting sites;
receiving a ranking of the proposed meeting sites from the user and the one or more friends; and
selecting a highest ranked proposed meeting site as the actual meeting site.

11. The method of claim 1, further comprising:
calculating an estimated time of arrival to the meeting site for each attendee; and
providing the estimated time of arrival to the user.

12. The method of claim 11, further comprising:
obtaining real-time location and travel speed data for an attendee; and
updating the estimated time of arrival based on the real-time data.

13. The method of claim 11, further comprising:
making a reservation at the meeting site, for the estimated time of arrival, and a number of attendees.

14. A mobile application stored on a non-transitory computer-readable medium comprising:
a location sharing feature to share a current location of a user with a subgroup of contacts, the subgroup selected by the user, based on a user preference;
a location display to display friends that have chosen to share their current location with the user in a local area to a user;
a user interface to enable a user to send a request to meet one or more of the friends shown in the location display;
an optimal location selector to calculate an optimal location for a meeting based on a current location of the user and a current location of the one or more friends to whom the request to meet was sent, the optimal location having approximately equal travel time for the user and the one or more friends wherein the travel time includes for a driver time to a parking location, and time to get from the parking location to the optimal location; and
a routing logic to provide a route to a meeting site for the user, upon acceptance of the request by at least one friend.

15. The application of claim 14, further comprising:
the optimal location selector takes into account historical location data obtained from a network, indicating past locations of the user or of friends of the user.

16. The application of claim 14, wherein the subgroup of contacts comprises one of: a selected subgroup of contacts in a contact database, members of a social group, members of a work-related group, and strangers.

17. The application of claim 14, wherein the optimal location selector is further to use estimated time of travel for each invited person, wherein the estimated time of travel takes into account a mode of transportation for each invited person.

18. The application of claim 14, further comprising:
an ETA calculator to calculate an ETA for each person to the meeting site;
a reservation logic to make a reservation at the meeting site, for the estimated time of arrival, and a number of attendees.

19. A method comprising:
providing a user interface, to enable a user to select one or more subsets of contacts, from a contact database, to share the user's current location to enable the subsets of contacts to initiate a meeting request;
sharing a current location of a user with the subsets of contacts;
providing a display of friends in a local area to a user, the friends indicating those individuals that chose to share their current locations with the user;
enabling a user to send a request to meet one or more of the friends shown in the display; and
calculating an optimal location for a meeting with the one or more friends, based on the user's current location and the current locations of the one or more friends, the optimal location having approximately equal travel time for the user and the one or more friends based on one or more of: mode of transportation, location of available parking, and traffic data, where the travel time includes for a driving user time to drive to the available parking and time to get from the available parking to the optimal location.

20. The method of claim 19, further comprising:
proposing a meeting site near the optimal location, based on a current location of each of the one or more friends that accepted the request to meet; and
providing directions to the user, to the meeting location, the directions depending on a mode of transportation of the user.

\* \* \* \* \*